United States Patent
El-Batal

(10) Patent No.: US 7,958,273 B2
(45) Date of Patent: Jun. 7, 2011

(54) SYSTEM AND METHOD FOR CONNECTING SAS RAID CONTROLLER DEVICE CHANNELS ACROSS REDUNDANT STORAGE SUBSYSTEMS

(75) Inventor: Mohamad El-Batal, Westminster, CO (US)

(73) Assignee: LSI Corporation, Milpitas, CA (US)

( * ) Notice: Subject to any disclaimer, the term of this patent is extended or adjusted under 35 U.S.C. 154(b) by 1024 days.

(21) Appl. No.: 11/545,872

(22) Filed: Oct. 10, 2006

(65) Prior Publication Data

US 2008/0162987 A1 Jul. 3, 2008

(51) Int. Cl.
*G06D 3/00* (2006.01)

(52) U.S. Cl. ............ 710/2; 710/300; 709/220; 709/238; 709/239; 711/114; 714/1; 714/100

(58) Field of Classification Search .................. 714/1, 6, 714/100; 711/114; 710/300
See application file for complete search history.

(56) References Cited

U.S. PATENT DOCUMENTS

| | | | |
|---|---|---|---|
| 7,035,952 B2 | 4/2006 | Elliott et al. | 710/300 |
| 7,549,002 B2 * | 6/2009 | Gasser et al. | 710/74 |
| 7,624,206 B2 * | 11/2009 | Bailey et al. | 710/51 |
| 7,627,005 B2 * | 12/2009 | Peeke | 370/532 |
| 7,644,304 B2 * | 1/2010 | Kotzur et al. | 714/7 |
| 2005/0015655 A1 * | 1/2005 | Clayton et al. | 714/6 |
| 2005/0066100 A1 * | 3/2005 | Elliott et al. | 710/300 |
| 2005/0071532 A1 * | 3/2005 | Bakke et al. | 710/300 |
| 2005/0080881 A1 * | 4/2005 | Voorhees et al. | 709/220 |
| 2005/0125574 A1 * | 6/2005 | Foster et al. | 710/36 |
| 2005/0289386 A1 * | 12/2005 | Tawil et al. | 714/6 |
| 2006/0020711 A1 * | 1/2006 | Nguyen et al. | 709/238 |
| 2006/0101171 A1 * | 5/2006 | Grieff et al. | 710/36 |
| 2006/0136644 A1 * | 6/2006 | Martin et al. | 710/302 |
| 2006/0155928 A1 * | 7/2006 | Mimatsu | 711/112 |
| 2006/0174085 A1 * | 8/2006 | Wu et al. | 711/170 |
| 2007/0070833 A1 * | 3/2007 | Long | 369/30.64 |
| 2007/0070994 A1 * | 3/2007 | Burroughs et al. | 370/381 |
| 2008/0005470 A1 * | 1/2008 | Davies | 711/114 |
| 2008/0126696 A1 * | 5/2008 | Holland et al. | 711/114 |
| 2009/0187707 A1 * | 7/2009 | Benhase et al. | 711/114 |

OTHER PUBLICATIONS

'A Comprehensive Guide to Serial Attached SCSI (SAS)' by Deming et al., Northwest Learning Associates, Inc., Copyright 2005.*
"Just a Bunch of Disks" (JBOD) from the PC Guide, found at www.pcguide.com/ref/hdd/perf/raid/levels/jbod-c.html on Aug. 7, 2004.* Archive.org showing date of PC Guide reference.*
'Serial Attached SCSI Architecture' by Rob Elliott, Hewlett Packard, Sep. 30, 2003.*

* cited by examiner

*Primary Examiner* — Henry W Tsai
*Assistant Examiner* — Steven G Snyder
(74) *Attorney, Agent, or Firm* — Suiter Swantz pc llo

(57) ABSTRACT

A system comprising a first expander device and a second expander device. The first expander device and the second expander device comprise a subtractive port and a table mapped port and are suitable for coupling a first serial attached SCSI controller to a second serial attached SCSI controller. The first and second expander devices are cross-coupled via a redundant physical connection.

12 Claims, 4 Drawing Sheets

US 7,958,273 B2

SYSTEM AND METHOD FOR CONNECTING SAS RAID CONTROLLER DEVICE CHANNELS ACROSS REDUNDANT STORAGE SUBSYSTEMS

FIELD OF THE INVENTION

The present invention relates generally to the field of data storage and more particularly to a system and method for connecting Serial Attached SCSI (SAS) RAID controller device channels across redundant storage subsystems.

BACKGROUND OF THE INVENTION

Serial Attached SCSI (SAS) is a storage interface suitable for providing full-duplex high speed communication. In a typical SAS RAID environment, redundant SAS RAID controllers reside within a single storage enclosure. In these instances, damage or failure of the RAID controller may require repair or replacement before operation of the storage subsystem can resume. Further, while the RAID array may provide redundancy for the data, damage or failure of other components within the subsystem may render data storage and access unavailable. Additionally, RAID controllers within a subsystem may be vulnerable to subsystem level failures such as localized damage, cable failure, power surges, and the like which affect only the subsystem. Thus, it may be desirable to house individual SAS RAID controllers in separate storage subsystems. However, interconnection of controllers across separate subsystems in a SAS environment requires consideration of routing and address mapping restrictions for providing interconnection for end devices. Specifically, a system providing a robust, redundant intercontroller connection between two or more controllers that does not violate basic SAS expander device routing and address mapping restrictions is necessary.

Consequently, it would be advantageous if a system and method existed for providing interconnection of SAS RAID controller devices across redundant storage subsystems.

SUMMARY OF THE INVENTION

Accordingly, the various embodiments of the present invention are directed to a system and method for interconnecting serial attached SCSI (SAS) redundant array of independent disks (RAID) controller device channels across redundant storage subsystems. In accordance with an aspect of an embodiment of the invention, a system for interconnecting SAS RAID controller device channels across redundant storage subsystems is considered. A system in accordance with an embodiment of the present invention may comprise at least two SAS controllers, each located in a distinct storage subsystem and at least two expander devices. Each of the at least two expander devices may be coupled to one of the at least two controllers. Each of the at least two expander devices may also be coupled to each other via a redundant physical connection. A system in accordance with an embodiment of the present invention may allow for the SAS expander devices to cross connect via at least two separate yet redundant wide SAS physical interconnections that may be comprised of two times two (×2) differential pair connections out of the two expander device wide subtractive and table-mapped ports. System may be suitable for providing interconnect fail-over protection. For instance, splitting the subtractive and table-mapped edge-expander port connections across two separate physical interconnects may allow for interconnect failover resulting in at least two wide subtractive and table-mapped edge-expander cross connect ports.

In accordance with an additional embodiment of the present invention, a method for providing interconnection of SAS RAID controller device channels across redundant storage subsystems is considered. Method may comprise providing a first expander device located in a first storage subsystem and a second expander device located in a second storage subsystem, each having a subtractive port and a table-mapped port, connecting the subtractive port of said first expander device to the table-mapped port of said second expander device via a first redundant physical connection, and connecting the subtractive port of said second expander device to the table-mapped port of said first expander device via a second redundant physical connection. Method may provide at least two wide subtractive and table-mapped expander device cross connected ports and may be suitable for providing interconnect fail-over protection.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
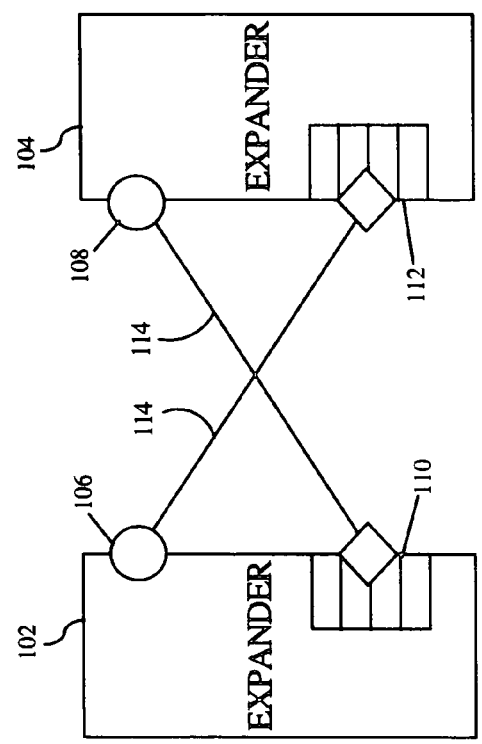
FIG. 1 is a block diagram of an expander device interconnect system in accordance with an exemplary embodiment of the present invention.

Referring to FIG. 1, a block diagram of an expander device interconnect system 100 in accordance with an exemplary embodiment of the present invention is shown. System 100 may be implemented with serial attached SCSI (SAS) architecture, or a like architecture suitable for supporting full duplex data transfer. SAS may refer to a point to point serial interface suitable for providing full duplex communication at three gigabits per second (Gb/s) or higher per direction per channel. In some embodiments, data transfer rate may be 6 Gb/s or higher. Protocols that may communicate via a SAS interface may be small computer system interface (SCSI), advanced technology attachment (ATA), SAS management or like protocols. SAS architecture may include devices such as end devices and expander devices. End devices may be devices such as SAS initiator devices, SAS target devices and serial ATA (SATA) devices. Expander devices may include edge expander devices, edge expander device sets and fanout expanders. SAS devices, such as end devices and expander devices, may be interconnected to deliver scalable storage in a SAS environment. SAS devices are typically interconnected with a set of point-to-point links in the SAS domain. SAS devices may also include at least two connections for enhanced performance and reliability. In an interconnection of SAS devices or SAS domain, each logical connection to a node is made via a port. A port may comprise a plurality of point-to-point links, which may be denoted as phys. For instance, a typical media device, such as a disk drive, may comprise two ports with each port including at least one phy. Additionally, multiple phys may be arranged together to make up a port, allowing for multiple concurrent connections to be established. Such ports may be designated as wide ports.

System 100 may comprise at least two expander devices 102, 104 having external ports suitable for connecting to SAS end devices. Each expander device 102, 104 may comprise a subtractive port 106, 108 and a table mapped port 110, 112. Expander devices 102, 104 may be coupled to each other via a redundant physical connection 114. Specifically, a system 100 in accordance with an embodiment of the present invention may allow the two expander devices to cross connect via at least two separate yet redundant wide SAS physical interconnects. Interconnects may be cable or routed, and may each be comprised of two wide differential pair links or connections out of the two expander device wide subtractive and table-mapped ports. Differential pair links may utilize differential signaling, where a signal is transmitted by a pair of driver devices transmitting complimentary signals on two lines. In differential signaling, the signal detected at the receiver may be the voltage difference between the two lines. Wide links may be times two (×2) wide links. In the present embodiment, fully redundant times four (×4) SAS external cables may be implemented between a table mapped port of a first expander device and a subtractive port of a second expander device. In this manner, system 100 may be suitable for providing interconnect fail-over protection for redundant storage subsystems. For instance, it is contemplated that splitting the subtractive and table-mapped edge-expander port connections across two separate physical interconnects may allow for interconnect failover resulting in at least two wide subtractive and table-mapped edge-expander cross connected ports. System 100 may further comprise at least two serial attached SCSI controllers, and each of the at least two expander devices 102, 104 may be coupled to one of the at least two serial attached SCSI controllers.

It is contemplated that expander devices 102, 104 may be edge expander devices or like expander devices suitable for communication with up to 128 SAS addresses. An edge expander device may enable communication to be established between nodes that are directly connected to the edge expander device. According to SAS specifications, an edge-expander may be comprised of one subtractive port for forwarding messages which do not correspond to stored routing tables for the expander device and a plurality of table-mapped connectivity expansion ports. This may enable larger communications among SAS devices. A table-mapped port may route all SAS commands to targets or initiators that are registered into the edge-expander domain table map at discovery time. A subtractive port may be utilized when a target or initiator is trying to address a SAS device with an address that is not in the domain table-map. For instance, if a SAS node makes a connection request to the edge expander requesting a node that is not directly connected to the edge expander, the request may be forwarded out via the subtractive routing port.

In some embodiments of a system 100 in accordance with the present invention, the respective subtractive routing ports of the edge expanders may be connected to a fanout expander. The fanout expander may include a routing table, and may be suitable for determining the correct edge expander to route the request, such as the edge expander to which the requested node is directly connected. Expander devices such as edge expanders may maintain a direct routing table suitable for identifying associated SAS addresses that may be directly coupled to the edge expander. Edge expanders may further utilize table or subtractive routing to direct frames to phys that may be more than one level removed from the edge expander. In one embodiment of a system 100 in accordance with the present invention, an expander device may utilize an internal table of addresses to route frames to attached devices (table routing). A table port may provide table addressing, typically utilized when the port connects to another expander device that may have multiple devices behind it. Lower edge expanders may utilize direct routing to transmit frames to directly attached SAS disk devices. In the foregoing manner, the size of the routing tables for each expander device may be minimized over that required for containing all the valid addresses for all the storage devices within the included subsystem. For example, a first communication link utilizing differential signaling and second communication link utilizing differential signaling may be included in each of the cables. The second communication link may be utilized for providing one of "direct" communication or "fail-over" communication between a subtractive port and a table port such that the receiving port detects or resolves only one port address even though two different communication links may be possible. Connecting the subtractive and table-mapped ports of at least two expander devices may be referred to as cross connecting. Cross connecting the subtractive and table-mapped ports of at least two expander devices may enable communications between each of a plurality of SAS devices via the available ports of the plurality of SAS devices. Furthermore, direct cross-connection of the subtractive and table-mapped ports may not expose multiple paths to the same address or create a data loop.

The first expander device 102 and the second expander device 104 may be communicatively coupled via a redundant physical connection 114 in a substantially similar manner so as to provide analogous interconnection. Redundant physical connection 114 may be a cable assembly implemented with either a single port or dual port connector. Connectors and cable assemblies may connect up to four physical SAS links. In one embodiment, a first cable 114 may include a communication link between the first subtractive port 106 and the second table port 112. A second cable 114 may comprise a communication link for communicatively coupling the first table port 110 with the second subtractive port 108. Redundant physical connection may provide cross communication between the subtractive port 106 of the first expander device 102 and the table mapped port 112 of the second expander device 104, and the subtractive port 108 of the second expander device 104 and the table mapped port 110 of the first expander device. In an embodiment, the interconnection of the first and second expander devices 102, 104 may provide two-by-two porting and permit communication in the event of the loss or failure of one of the cables.

Figure 2:
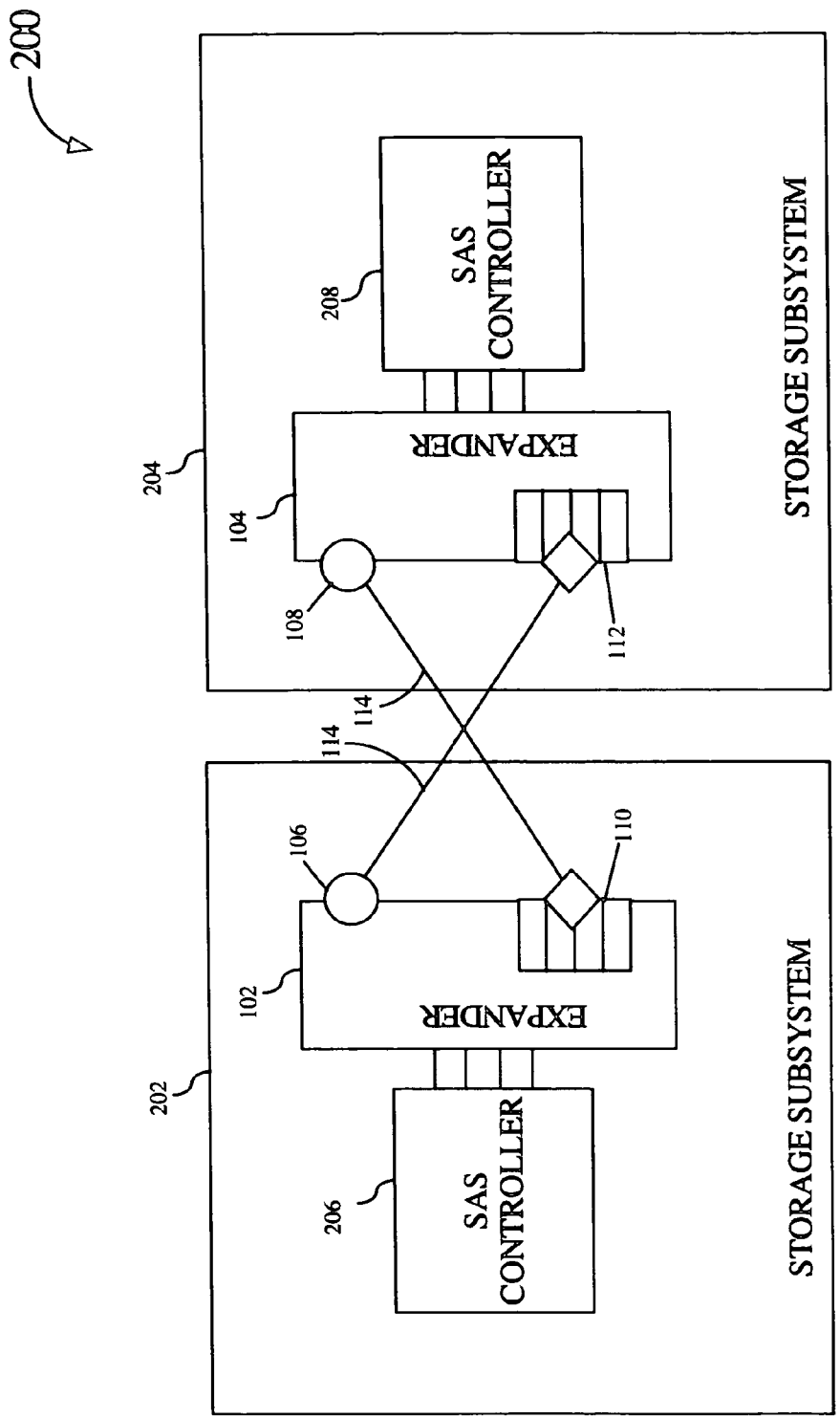
FIG. 2 is a block diagram of a SAS RAID controller system comprising an expander device interconnect system in accordance with an exemplary embodiment of the present invention.

Referring to FIG. 2, a block diagram of a SAS controller system 200 comprising an expander device interconnect system 100 in accordance with an exemplary embodiment of the present invention is shown. The system 100 may provide interconnection for a first edge expander 106 located in a first storage subsystem 202 and a second edge expander 108 located in a second storage subsystem 204 to allow for a controller interconnection across redundant storage subsystems. SAS controller system 200 may include at least two SAS controllers 206, 208. Controllers 206, 208 may be SAS initiators or host devices. For example, controllers 206, 208 may be redundant array of independent disk (RAID) controllers. In one embodiment, a first storage subsystem 202 may include a first RAID controller 206. A second storage subsystem 204 may include a second RAID controller 208. A first expander device 102 in a first storage subsystem 202 and a second expander device 104 in a second storage subsystem 204 may be communicatively coupled via an interconnection system 100 as contemplated by the present invention. Interconnection may permit targeting of data storage drives in either a first array or a second array by a first RAID controller 206 and a second RAID controller 208. In the present instance, the controllers 206, 208 may operate in conformance with SAS protocol. In the present embodiment, the individual hardware, such as an integrated circuit, forming the edge expanders may be substantially similar.

Each SAS controller may be coupled to a SAS fanout device or expander device. In the example of FIG. 2, SAS controller 206 may be coupled to SAS expander device 102, and SAS controller 208 is coupled to SAS expander device 104. SAS expander devices 102, 104 may be coupled to one another through at least two redundant physical links 114. The system 200 may permit redundant active control of multiple storage subsystems to minimize system level failure from impacting control of the data storage devices within the system. The system 200 may minimize controller failure by disposing individual redundant controllers in separate subsystems which may be enclosed in different enclosures. In the current embodiment, the system 200 includes a first storage subsystem 202 and a second storage subsystem 204. Each of the first subsystem 202 and the second subsystem 204 individually include an array of storage devices. A variety of data storage devices may be implemented as contemplated by those of skill in the art. Additionally, an array of storage devices may be configured with differing levels of redundancy, such as a RAID-1/10 configuration, a RAID-5 configuration, and the like as desired.

Figure 3:
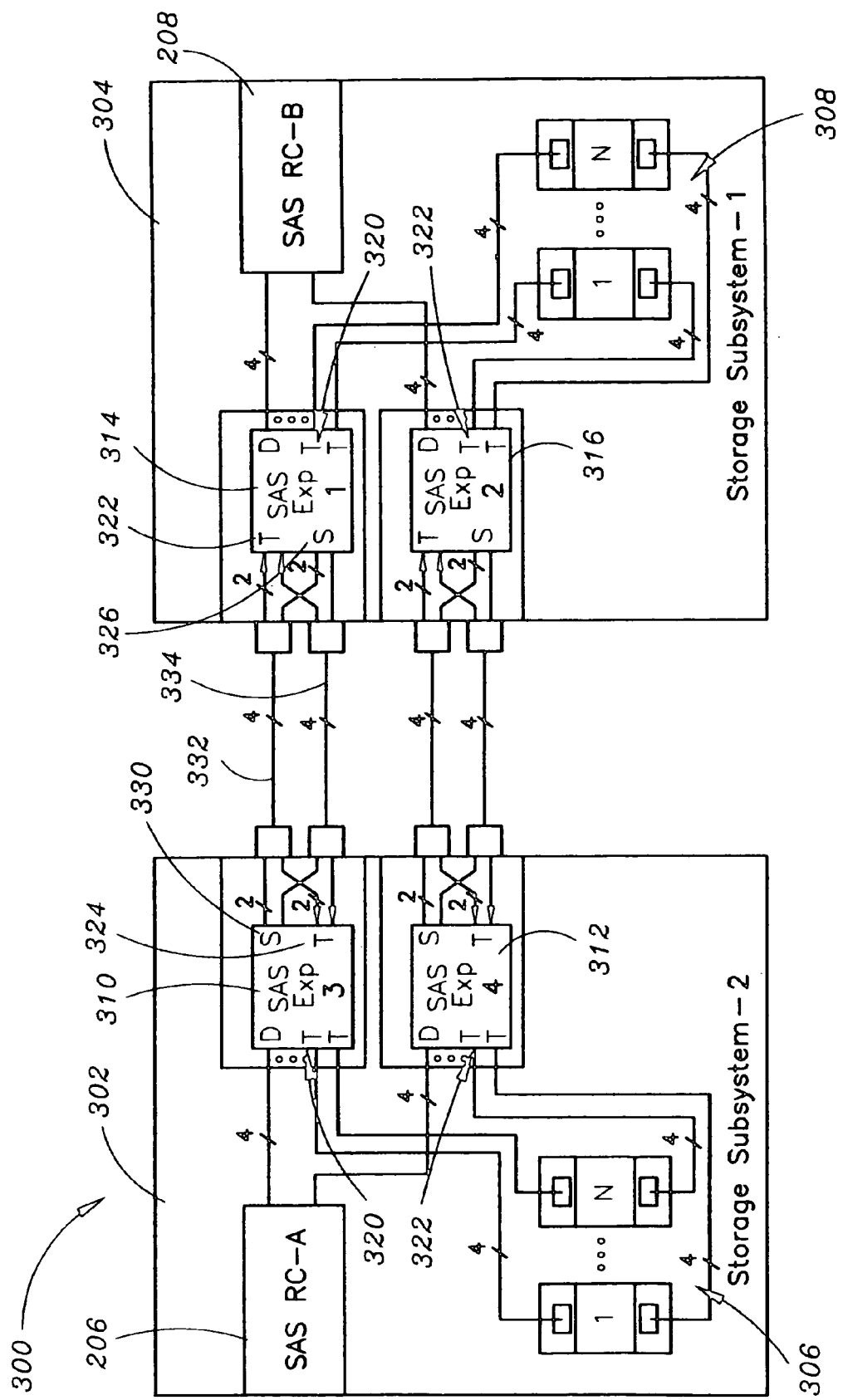
FIG. 3 is a block diagram of an additional embodiment of a SAS RAID controller system comprising an expander device interconnect system in accordance with an exemplary embodiment of the present invention.

Referring to FIG. 3, a block diagram of an additional embodiment of a SAS RAID controller system 300 comprising an expander device interconnect system in accordance with an exemplary embodiment of the present invention is shown. As is demonstrated in FIG. 3, system 300 may be suitable for providing half-width (×2) SAS subtractive port connections from each SAS expander utilizing half the full width (×4) external connections. System 300 may therefore allow full-width external inter-controller connections or cables to be fully redundant from a subtractive and table-map perspective. The system 300 may permit redundant active control of multiple storage subsystems to minimize system level failure from impacting control of the data storage devices within the system. The system 300 may also minimize controller failure by disposing the redundant controllers in separate subsystem which may be included in different enclosures. In the current embodiment, the system 300 may comprise a first storage subsystem 302 and a second storage subsystem 304. Each of the first subsystem 302 and the second subsystem 304 may individually comprise at least one RAID array of storage devices 306, 308. A variety of data storage devices may be implemented as contemplated by those of skill in the art. Additionally, an array of storage devices 306, 308 may be configured with differing levels of redundancy, such as a RAID-1/10 configuration, a RAID-5 configuration, and the like as desired.

The first storage subsystem 302 may comprise a first controller 206, and the second storage subsystem 304 may comprise a second controller 208. Controllers 206, 208 may be RAID controllers such as SAS RAID controllers. In an embodiment of the system 300, the controllers 206, 208 may operate in conformance with SAS protocol. Each of storage subsystems 302, 304 may further comprise at least two edge expander devices 310, 312, 314, 316. In the present embodiment, the individual hardware, such as an integrated circuit, forming the edge expanders may be substantially similar. It is to be appreciated that differing software configurations such as a routing table for forwarding table routing and subtractive routing data may be included in the edge expanders based on the relative interrelationship of the various edge expanders or be dynamically provided by a SAS host/initiator device. For example, the routing tables between edge expanders vary for table routing and subtractive routing based on the integration of the edge expander in the system. In other embodiments, the individual edge expander hardware may vary depending on design preference.

The RAID controller 206 of storage subsystem 302 may be communicatively connected to edge expanders 310, 312 via direct routing SAS methodology. Edge expanders 310, 312 may be communicatively coupled to a storage device in the storage subsystem 302. For example, edge expanders 310, 312 may be individually coupled, via table ports such as table ports 320 and 322, to each of the data devices (data drives "1" through "N" are indicated) included in the storage subsystem 302 for permitting table routing SAS methodology. Thus, data may be forwarded by either of the at least two edge expander devices 310, 312. Additional table ports may be included in the edge expander devices 310, 312 as required. Storage subsystem 304 may comprise at least two edge expander devices 314, 316, and storage subsystem 304 may be arranged and configured in substantially a similar manner as storage subsystem 302.

With continued reference to FIG. 3, edge expanders 310, 312 may be communicatively coupled to permit targeting of a data storage drive by in either the first array or the second array by the SAS RAID controller 206 and edge expanders 314, 316 may be communicatively coupled to permit targeting of a data storage drive by in either the first array or the second array by the SAS RAID controller 208. As described in FIG. 2, in the present embodiment, fully redundant ×4 (times four) SAS external cables may be implemented between a table port 324 of edge expander 310 and a subtractive port 326 of edge expander 314. Those of skill in the art will appreciate that each edge expander 310, 312, 314, 316 in the current example, may comprise a single subtractive port for forwarding messages which do not correspond to stored routing tables for the edge expander. In the foregoing manner, the size of the routing tables for each edge expander 310, 312, 314, 316 is minimized over that required for containing all the valid addresses for all the storage devices within the included subsystem. For example, a first communication link utilizing differential signaling and second communication link utilizing differential signaling may be included in each of the cables 332, 334, 336, and 338. The second communication link may be utilized for providing one of "direct" communication or "fail-over" communication between a subtractive port and a table port. Those of skill in the art will appreciate that the term "fail over" may include a cross communicative coupling the various subtractive port and table-mapped port such that the receiving port detects or resolves only one port address even though two different communication links are possible. For instance, a first cable 332 may include a communication link for communicatively coupling a subtractive port 330 of expander device 310 with a table mapped port 332 of expander device 314 and may also include a second communication link providing cross communication between a table mapped port 324 of edge expander device 310 and a subtractive port 326 of edge expander device 314. A second cable 334 may include a communication link between a table mapped port 324 of edge expander device 310 and a subtractive port 326 of edge expander device 314, as well as, a cross connection for providing communication between the subtractive port 330 of edge expander device 310 and a table mapped port 332 of edge expander device 314. In an embodiment, the interconnection of edge expanders 310, 314 may allow for two-by-two porting and permits communication even in the event of the loss or failure of one of the cables. It is further contemplated that edge expanders 312 and 316 may be communicatively coupled in a substantially similar manner so as to provide analogous interconnection.

Figure 4:
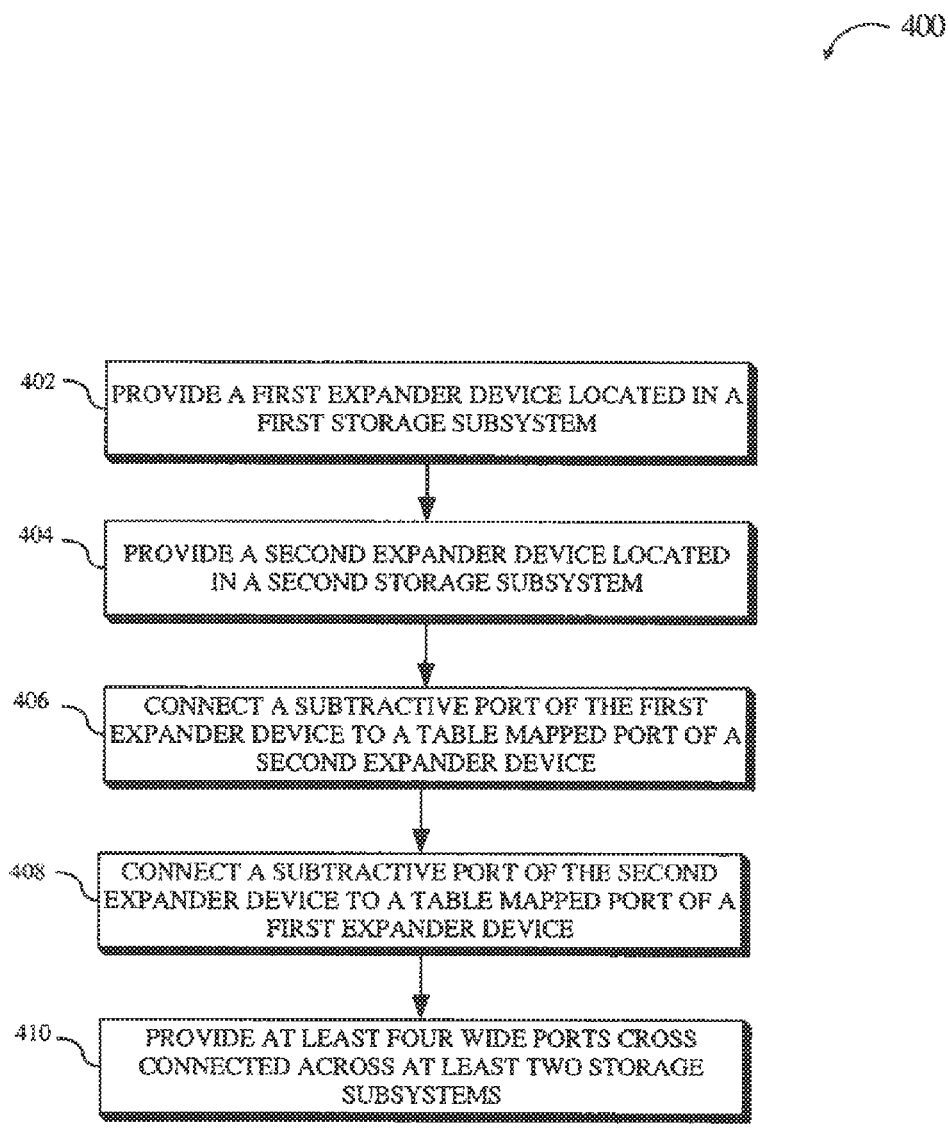
FIG. 4 is flow diagram of a method in accordance with an exemplary embodiment of the present invention.

Referring to FIG. 4, a method 400 for providing interconnection of high-speed SAS RAID controller device channels across redundant storage subsystems is considered. Method may comprise providing a first expander device located in a first storage subsystem 402 and a second expander device located in a second storage subsystem 404, each having a subtractive port and a table-mapped port. Method may further comprise connecting the subtractive port of said first expander device to the table-mapped port of said second expander device via a first redundant physical connection 406, and connecting the subtractive port of said second expander device to the table-mapped port of said first expander device via a second redundant physical connection 408. Method may provide interconnect failover by providing at least four wide ports cross connected across at least two storage systems. Wide ports may be subtractive and table-mapped wide ports. Wide subtractive and table-mapped ports may be times two wide ports, having two available ports for interconnection. It is further contemplated that wide ports may provide additional available ports for interconnection. Method may be suitable for providing interconnection of high-speed Serial Attached SCSI (SAS) redundant array of independent disks (RAID) controller device channels across redundant storage subsystems.

It is to be appreciated that differing software configurations such as a routing table for forwarding table routing and subtractive routing data may be included in the edge expanders based on the relative interrelationship of the various edge expanders or be dynamically provided by a SAS host or initiator device. For example, the routing tables between edge expanders vary for table routing and subtractive routing based on the integration of the edge expander in the system. In other embodiments, the individual edge expander hardware may vary depending on design preference.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed the system of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system comprising:
   a first storage subsystem comprising:
      a first redundant array of independent disks (RAID) controller; and
      a first edge expander device, said first expander device communicatively coupled to said first RAID controller and further comprising a single subtractive port and a table mapped port;
      a first enclosure, said first enclosure housing said first redundant array of independent disks (RAID) controller and said first edge expander device;
   a second storage subsystem comprising:
      a second redundant array of independent disks (RAID) controller; and
      a second edge expander device, said second expander device communicatively coupled to said second RAID controller and further comprising a single subtractive port and a table mapped port;
      a second enclosure, said second enclosure housing said second redundant array of independent disks (RAID) controller and said second edge expander device;
   a first communication link coupling said single subtractive port of said first edge expander device to said table mapped port of said second edge expander device; and
   a second communication link coupling said single subtractive port of said second edge expander device to said table mapped port of said first edge expander device.

2. The system of claim 1, wherein said first communication link and said second communication link are suitable for providing interconnect failover that results in at least two cross connected wide subtractive ports and wide table-mapped ports.

3. The system of claim 1, wherein the first communication link and the second communication link are included in one physical cable.

4. The system of claim 1, wherein said first edge expander device and said second edge expander device are individually coupled to a data drive included in a plurality of data drives comprising a Serial Attached SCSI (Small Computer System Interface) (SAS) RAID array.

5. The system of claim 1, wherein the first storage subsystem includes a third edge expander device, said third edge expander device communicatively coupled to said first RAID controller and further comprising a single subtractive port and a table mapped port.

6. The system of claim 5, wherein the second storage subsystem includes a fourth edge expander device, said fourth edge expander device communicatively coupled to said second RAID controller and further comprising a single subtractive port and a table mapped port.

7. The system of claim 6, wherein said first subsystem includes a first array of storage devices.

8. The system of claim 7, wherein said second subsystem includes a second array of storage devices.

9. The system of claim 8, wherein the first edge expander device and the third edge expander device are coupled to each device of said first array of storage devices.

10. The system of claim 9, wherein the second edge expander device and the fourth edge expander device are coupled to each device of said second array of storage devices.

11. The system of claim 10, further comprising a third communication link coupling said single subtractive port of said third edge expander device to said table mapped port of said fourth edge expander device.

12. The system of claim 11, further comprising a fourth communication link coupling said single subtractive port of said fourth edge expander device to said table mapped port of said third edge expander device.

* * * * *